(No Model.)
H. C. WIEDENMANN.
STAND FOR BICYCLES.
No. 488,464. Patented Dec. 20, 1892.
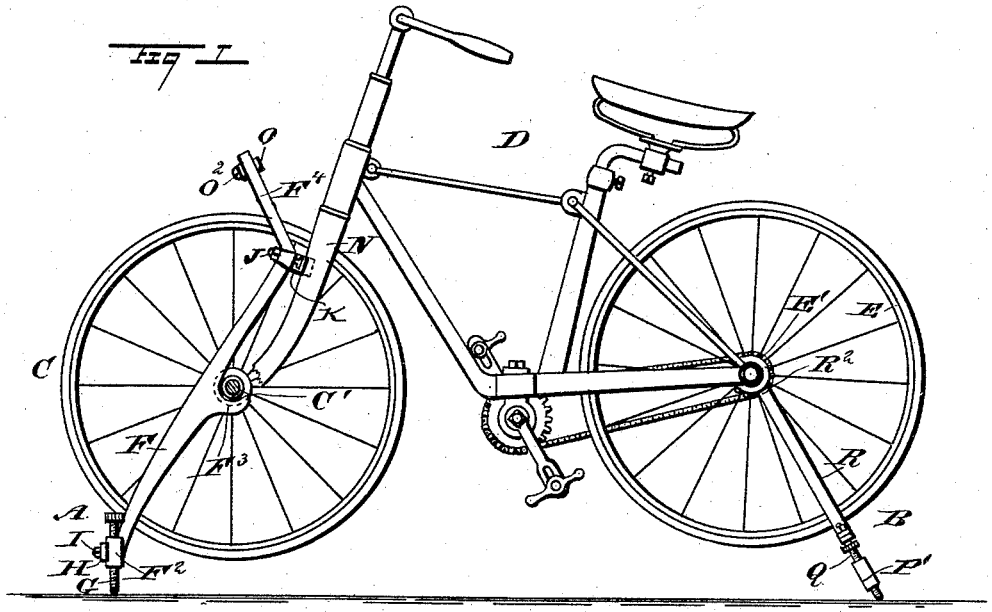
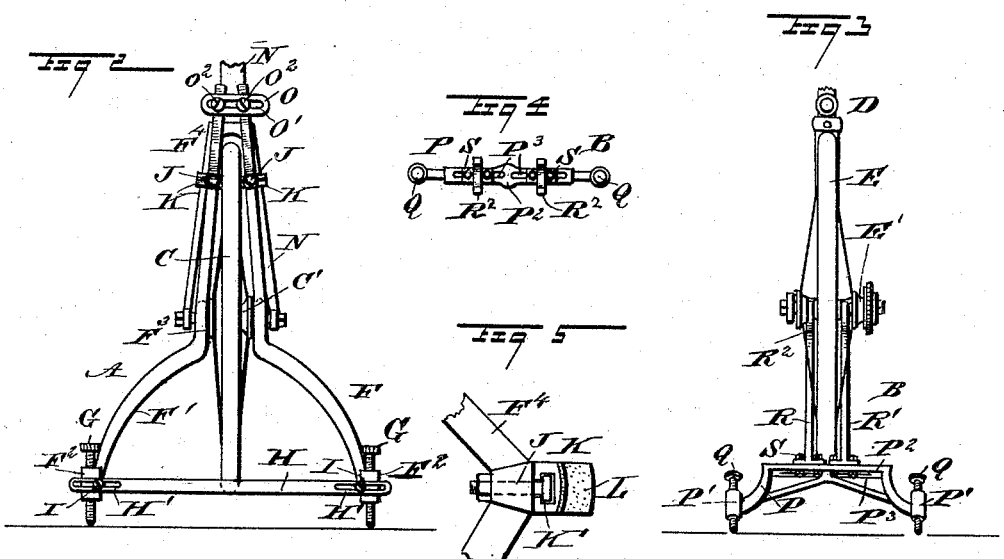
WITNESSES:
H. Walker
C. Sedgwick
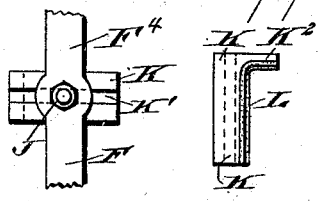
INVENTOR
H. C. Wiedenmann
BY
Munn & Co
ATTORNEYS.

UNITED STATES PATENT OFFICE.

HERMAN C. WIEDENMANN, OF PHILADELPHIA, PENNSYLVANIA.

STAND FOR BICYCLES.

SPECIFICATION forming part of Letters Patent No. 488,464, dated December 20, 1892.

Application filed March 21, 1892. Serial No. 425,753. (No model.)

*To all whom it may concern:*

Be it known that I, HERMAN C. WIEDENMANN, of Philadelphia, in the county of Philadelphia and State of Pennsylvania, have invented a new and Improved Bicycle-Stand, of which the following is a full, clear, and exact description.

The object of the invention is to provide a new and improved bicycle stand, which is simple and durable in construction, readily applied to any bicycle to support the same in an upright position, and to hold the wheels above the ground.

The invention consists of two independent frames adapted to engage the hubs of the wheels and each provided with laterally adjustable standards.

The invention also consists of certain parts and details and combinations of the same, as will be fully described hereinafter and then pointed out in the claims.

Reference is to be had to the accompanying drawings forming a part of this specification, in which similar letters of reference indicate corresponding parts in all the figures.

Figure 1 is a side elevation of the improvement as applied, with parts in section; Fig. 2 is a front end view of the same; Fig. 3 is a rear end view of the same; Fig. 4 is a plan view of the rear frame; Fig. 5 is an enlarged side elevation of the rest for the front standards; Fig. 6 is a front end view of the same; and Fig. 7 is a plan view of the rest.

The improved bicycle stand is provided with the two frames A and B, of which the frame A is adapted to engage the hub C' of the front wheel C of the bicycle D of any approved construction. The other frame B is adapted to engage the hub E' of the rear wheel E of the said bicycle, the said two frames, when applied, supporting the bicycle in an upright position with the wheels C and E above the ground or floor.

The frame A for the front wheel C is provided with the two standards F and F', spread outward at their lower ends, as is plainly illustrated in Fig. 2, the lower end of each of the standards being provided with a lug $F^2$, in which screws a set screw G, adapted to rest on the ground, the lower end being tipped with rubber or other suitable soft material, to prevent injury to the floor or carpet on which the stand is located.

The lugs $F^2$ of the two standards F and F' are connected with each other by a cross bar H, formed in its ends with slots H', engaged by set screws I, screwing in the said lugs $F^2$. By loosening the set screws I the standards F and F' may be moved farther apart or closer together, as desired, so as to bring the standards in proper relation to the size of the front wheel C. When the standards F and F' are adjusted, the set screws I are screwed up so that the lower ends of the standards are rigidly connected with each other.

Each of the standards F and F' is formed with a fork $F^3$, adapted to engage the hub C' of the wheel C, as is plainly illustrated in Fig. 1, so that the wheel is supported in the said standards. It is understood that these standards F and F' engage the wheel at its opposite sides, thus equally supporting the wheel at its opposite sides. Near the upper end of each standard F is held a bolt J, engaging with its head, a transversely extending groove K' formed in the rest K, provided at its inner end with a rearwardly extending flange $K^2$, as is plainly illustrated in Figs. 5, 6 and 7. The rear surface of this rest K is lined with rubber L, or other suitable material, and this inner lined surface engages the fork N for the front wheel C, as will be readily understood by reference to Figs. 1 and 2.

From the upper ends of the standards F, directly above the bolts J, extend upward and forward the arms $F^4$, reaching above the top of the wheel C and connected with each other by a cross piece O, formed with a transverse slot O', engaged by set screws $O^2$, screwing into the arm $F^4$. When the set screws $O^2$ are loosened, the upper ends of the standards F and F' may be moved near together or far apart in conjunction with the lower ends, as previously described, so as to adjust the two standards to the size of the wheel.

The rear frame B is provided with a transversely extending base P, formed at its ends with lugs P', in which screw the screws Q, adapted to rest at their lower ends on the floor or carpet, the set screws being rubber tipped similarly to the screws G. The top $P^2$, of the base P is formed with transverse slots $P^3$, engaged by bolts S, for fastening the standards R and R', to the said top $P^2$, and the upper ends of the standards R and R' are formed with forks $R^2$, engaging the hub E' of the wheel E at opposite sides, as will be readily understood by reference to Fig. 3. By loosening the bolts S, the standards R and R' can be adjusted transversely so as to move the said standards the desired distance apart to permit their forks R² to engage the hub E' of the wheel E.

The device is used as follows: The standards F and F' of the frame A are adjusted by the cross bars H and O according to the width of the wheel C, and when it is desired to place the bicycle on the stand, the operator holds the frame A in an inclined position, as illustrated in Fig. 1, then lifts the front end of the bicycle so as to pass the hub C' of the wheel C into the forks F³ of the standards F, F'. By doing so, the rests K of the two standards F and F' abut against the fork N of the bicycle D whereby the said frame A is held in place and at the same time supports the front end of bicycle. The operator then takes hold of the rear part of the bicycle D, lifts the same, and places the frame B in an inclined position with the standards R and R' passing between the spokes of the wheel E to engage, with their forks R², the hub E' of the rear wheel. The frame B is preferably placed in an inclined position extending forward, as is plainly shown in Fig. 1. The bicycle D is now securely supported on the stand with the wheels C and E lifted off the ground or floor.

The screws G and Q serve to adapt the stand for bicycles of larger and smaller wheels; as the forks of the standards can be raised or lowered by adjusting the said screws to hold the wheels off the ground or floor.

When it is desired to use the bicycle, the operator first removes the frame B by lifting up the rear part of the bicycle so as to disengage the hub E' from the forks R² of the standards R and R'. The frame B can then be conveniently removed from the rear wheel, which latter is then set on the ground or floor, after which the operator lifts the front of the bicycle so as to move the hub C' of the front wheel C out of the forks F³ of the standards F and F'. The frame A can then be readily removed from the wheel C and the bicycle is then completely disengaged from the stand and can be wheeled off.

It will be seen that the several parts of the stand are adjustable, so as to readily fit a bicycle of any construction. It will further be seen that the two frames A and B can be conveniently stored away when not used for supporting the bicycle, and as the two frames are totally independent of each other, they can be stored away in a very little space.

Having thus described my invention, I claim as new, and desire to secure by Letters Patent:—

1. A bicycle stand, comprising two independent frames adapted to engage the hubs of the front and rear wheels of the bicycle, each of the said frames being provided with laterally adjustable standards, substantially as shown and described.

2. A bicycle stand, provided with a frame for the front wheel of the bicycle, and comprising two standards connected with each other at the top and bottom, and each formed with a fork adapted to be engaged by the hub of the wheel at opposite sides of the latter, substantially as shown and described.

3. A bicycle stand, provided with a frame adapted to engage the front wheel of the bicycle, and comprising two standards connected with each other at the top and bottom and formed with forks adapted to receive the hub of the wheel, and a rest secured on each of the said standards and adapted to engage the fork for the front wheel, substantially as shown and described.

4. A bicycle stand, provided with a frame adapted to engage the front wheel of the bicycle, and comprising two standards connected with each other at the top and bottom and formed with forks adapted to receive the hub of the wheel, a rest secured on each of the said standards and adapted to engage the fork for the front wheel, and means, substantially as described, for transversely adjusting each rest so as to fit onto the respective arm of the fork, as set forth.

5. A bicycle stand, provided with a frame adapted to engage the front wheel of the bicycle, and comprising two standards connected with each other at the top and bottom and formed with forks adapted to receive the hub of the wheel, a rest secured on each of the said standards and adapted to engage the fork for the front wheel, and rubber tipped screws screwing in lugs on the lower ends of the said standards, substantially as shown and described.

6. A bicycle stand, provided with a frame for supporting the front wheel of the bicycle, and comprising two standards formed with forks adapted to receive the hub of the wheel, a rest held on each of the standards and engaging an arm of the fork of the wheel, and slotted transversely extending bars for connecting the upper ends and the lower ends of the said standards with each other, substantially as shown and described.

7. A bicycle stand, provided with a rear frame adapted to support the rear wheel of the bicycle, and comprising a base formed with lugs at its lower ends, rubber tipped screws screwing in said lugs, and standards held transversely adjustable on the said base and each formed at its upper end with a fork to receive the hub of the rear wheel, substantially as shown and described.

HERMAN C. WIEDENMANN.

Witnesses:
WILLIAM H. COOKE,
WALTER G. GREEN.